United States Patent [19]

Musial

[11] 4,061,158

[45] Dec. 6, 1977

[54] VALVE WITH COMBINATION LOCK AND REMOTE CONTROL

[76] Inventor: George J. Musial, 13 Townsend Road, Lynnfield, Mass. 01940

[21] Appl. No.: 744,034

[22] Filed: Nov. 22, 1976

[51] Int. Cl.² ............................................. F16K 37/00
[52] U.S. Cl. .............................. 137/552.5; 137/614.17; 251/297; 251/294
[58] Field of Search ............... 137/384.4, 552.5, 637.3, 137/614.17; 70/175, 242; 251/297

[56] References Cited

FOREIGN PATENT DOCUMENTS

| 398,303 | 9/1933 | United Kingdom | 137/552.5 |
| 928,744 | 6/1963 | United Kingdom | 137/552.5 |

*Primary Examiner*—Martin P. Schwadron
*Assistant Examiner*—A. Michael Chambers
*Attorney, Agent, or Firm*—Dike, Bronstein, Roberts, Cushman & Pfund

[57] ABSTRACT

A combination lock and remote control valve for controlling admission of fuel to the carburetor of an automobile engine wherein an actuator is movable axially and in rotation to align ports in concentrically arranged parts of the valve to permit flow through the valve.

9 Claims, 8 Drawing Figures

VALVE WITH COMBINATION LOCK AND REMOTE CONTROL

BACKGROUND OF INVENTION

The combination lock and valve herein illustrated is designed to enable the operator to determine the correct positioning of the valve actuator to effect opening and closing once the combination is known by the audible clicking of detents provided for this purpose, which detents also determine the open and closed positions of the valve parts, to stymie manipulation by an unauthorized operator to open the valve in the absence of knowing the proper combination and to simplify manufacture and installation. The audible clicking provides the advantage that the device may be manipulated without having to match indicia on a pointer or dial and so can be manipulated in uncertain light or darkness without the aid of a flashlight.

SUMMARY OF INVENTION

As herein illustrated, the combination lock and remote control valve comprises a valve body containing a valve chamber and spaced ports, an actuator and concentric telescopically mounted sleeve in the valve chamber, said actuator and sleeve containing openings adaptable at times to be oriented with respect to the ports in the valve body to provide for a continuous passage through the valve body, means for rotating the actuator and moving it axially in the chamber, said sleeve containing an axial slot, means normally releasably locking the sleeve in a predetermined position, a pin fixed to the actuator movable with the actuator in rotation to position it opposite the slot in the sleeve at said predetermined position and axially along the slot to disable said last means, said actuator being thereafter rotatable to effect rotation of the released sleeve to align the openings in the sleeve with said spaced ports, movable axially to lock the sleeve in its open position, rotatable to align the opening therein with the openings in the sleeve and, finally, axially to engage the pin with the sleeve to lock the several components in the open position on the valve. The means for releasably locking the sleeve comprise peripherally spaced detents in the sleeve and a spring-pressed ball supported in the valve body for engagement with the detents as the sleeve is rotated relative thereto. Axial movement of the pin along the slot in the sleeve disengages the ball from the detent at the locking position. There is means for limiting rotation of the actuator at the locking position to rotation in a clockwise direction, said means comprising spaced detents in the peripheral surface of the actuator and a spring-pressed ball supported in the body for engagement with the detents. Axial and rotatable movement of the actuator is provided for by a flexible cable connected to one end of the actuator. A control knob is provided at the opposite end of the cable to facilitate rotating the actuator according to the predetermined combination.

The invention will now be described with reference to the accompanying drawings, wherein.

Figure 1:
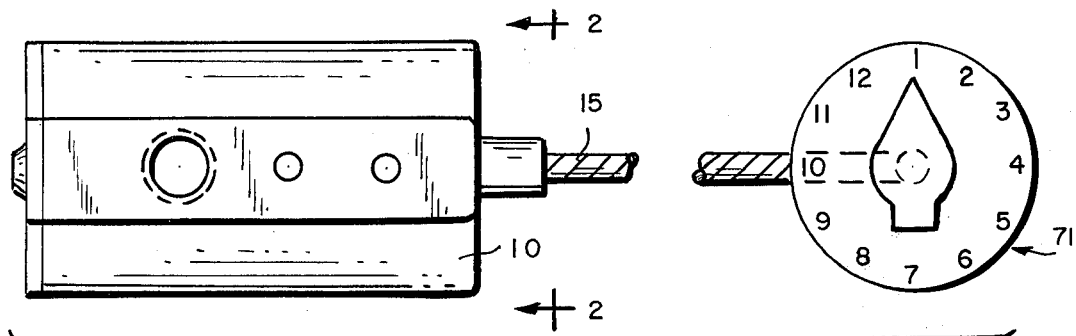
FIG. 1 is a plan view of the device with a portion of its actuating cable broken away and showing the control knob in elevation.

Referring to the drawings, the device comprises essentially a valve body 10, an actuator 12, a sleeve 14, and means 15 for effecting movement of the actuator.

Figure 2:
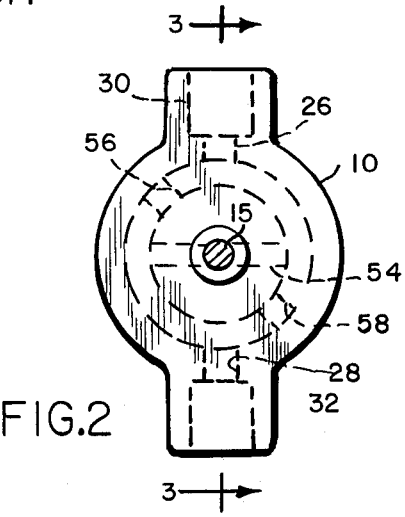
FIG. 2 is an end view of FIG. 1 taken on the line 2—2 of FIG. 1.

The valve body 10 is a generally cylindrical block which contains an axially arranged cylindrical valve chamber comprising a cylindrical portion 16 of predetermined diameter, a cylindrical portion 18 of smaller diameter and a cylindrical portion 20 of still smaller diameter, all arranged in axial concentric alignment as named. The left end of the chamber 16 as shown in FIGS. 1 and 2 is covered by a closure plate 22. The right end of the chamber 20 contains a relatively small circular opening 24. The valve body also contains peripherally spaced ports 26 and 28 which open into the chamber 16 at one end and are connected at their opposite ends to threaded openings 30 and 32 for receiving threaded nipples. The chamber 18 contains in its peripheral wall an opening 34 within which there is supported a spring-pressed ball 36 and the chamber 20 has a corresponding opening 38 within which there is a spring-pressed ball 40.

Figure 6:
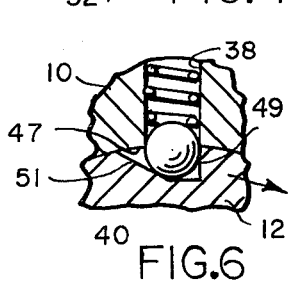
FIG. 6 is a fragmentary section taken on the line 6—6 of FIG. 3 showing the actuator lock.
Figure 7:
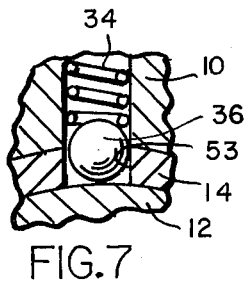
FIG. 7 is a fragmentary section taken on the line 7—7 of FIG. 3 showing the sleeve lock.
Figure 8:
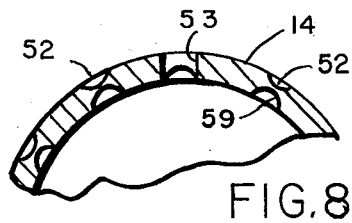
FIG. 8 is an enlarged fragmentary transverse section of the actuator.

The actuator 12 is cylindrical and is of such diameter as to be rotatively and axially movable within the chamber 20. One end of the actuator has a cylindrical hub 42 which extends through the opening 24. At the protruding end of the hub, there is secured the means 15 for effecting rotation and axial movement of the actuator which as herein illustrated is in the form of a flexible cable. The actuator contains in axially spaced relation a peripheral groove 44 and peripherally spaced semispherical detents 46 so arranged in the cylindrical surface of the actuator that in one axial position the spring-pressed ball 40 will engage a detent 46 and in another axial position it will engage the groove 44. The detents 46 are all semispherical except for one 47, FIG. 6, which has a vertical side 49 and a slanted side 51 so that the actuator can be rotated only in a clockwise direction to release it from the ball 40.

The sleeve 14 has an inside diameter which corresponds to the outside diameter of the actuator so as to be axially movable thereon and rotatable relative thereto. The outside diameter of the sleeve comprises a cylindrical portion 48 which corresponds to the inside diameter of the cylindrical portion 16 of the chamber and a cylindrical portion 50 which corresponds to the cylindrical portion 18 of the chamber. This latter portion of the sleeve contains in its outer surface semispherical detents 52 except for one which is a radial opening 53 through the wall of the sleeve within which the spring-pressed ball 36 engages and internally a corresponding number of axial grooves 59. One of the grooves 59 intersects the radial opening 53 so that when the spring-pressed ball 36 is engaged within the opening 53, it locks the sleeve to the body. The actuator has fixed to it an actuating pin 62 having an inclined upper end which may be moved axially in the groove 59 which intersects the radial opening 53 to lift the ball out of the opening and thus release the sleeve.

The ports 26 and 28 in the body and the openings 56 and 58 in the sleeve are axially offset and the passage 54 in the actuator is diagonally disposed so that, when properly oriented, its ends will be in communication with the openings 56 and 58.

The closure plate 22 functions not only as a dust plate, but also as a mounting plate for fastening the device to a suitable support on the engine block or chassis of the vehicle in which it is to be installed.

As shown in FIG. 1, a control knob 71 is provided at the distal end of the cable to assist in manipulating the device to open and close it.

Figure 3:
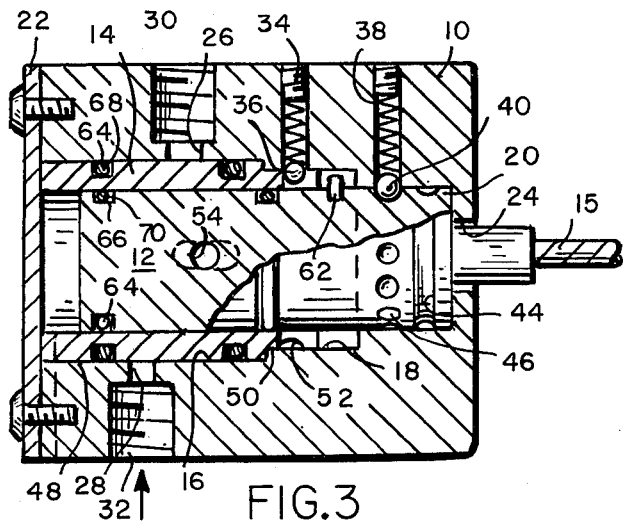
FIG. 3 is a diametral section longitudinally of the device taken on the line 3—3 of FIG. 2 showing the device in the closed position.
Figure 4:
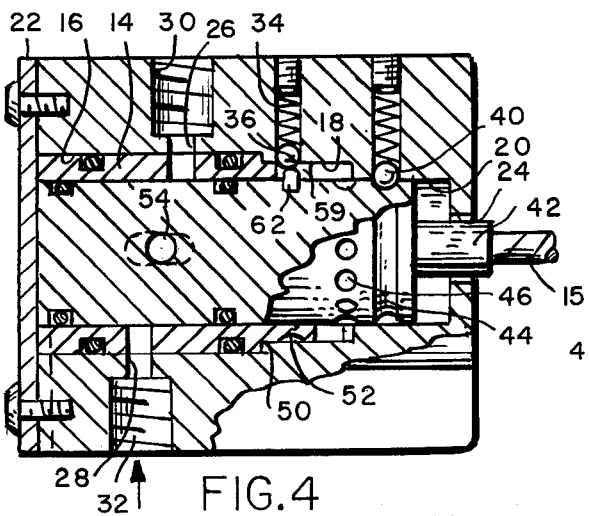
FIG. 4 is a view similar to FIG. 3 showing the device in an intermediate position between closed and open positions.
Figure 5:
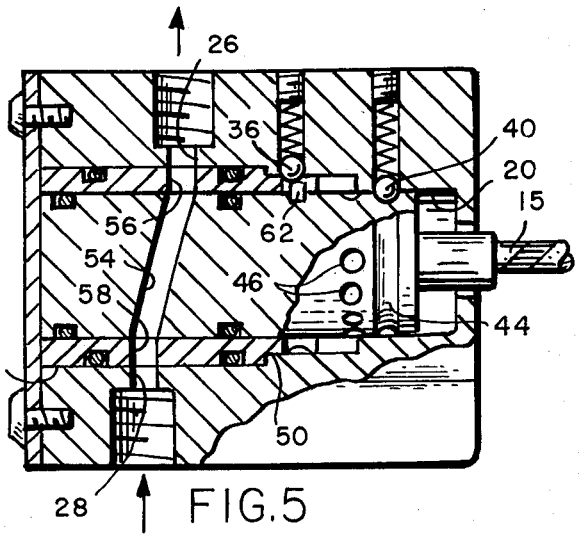
FIG. 5 is a view similar to FIG. 3 showing the device fully open.

The device is designed to be placed in the fuel line of an automobile to close the fuel line to the engine in order to protect unauthorized use of the automobile and, to this end, the fuel line is broken and the device is interposed by connecting the separate ends of the fuel line to nipples threaded into the openings 30 and 32. FIG. 3 illustrates the closed position of the device, FIG. 4 an intermediate position and FIG. 5 the open position.

The device operates as follows. First the cable 15 is rotated in a clockwise direction a predetermined number of detents to the right which will bring the pin 62 to a position opposite the axial groove 59 in the sleeve which is the locked position of the valve. The actuator can only be rotated clockwise and since all of the detents 46 are semispherical, the spring-pressed ball 40 will move in and out of the detents, creating a pulse at each detent. The operator counts detents for a known combination until the pin 62 is opposite the groove 59. The actuator is now pushed axially by means of the cable to move the actuator pin 62 along the groove 59 into a position beneath the detent ball 36 and, by such movement, to displace the detent ball from the opening 53 in the sleeve, thus releasing the sleeve from the valve body. Movement of the pin 62 into engagement with any other of the grooves 59 will not displace the spring-pressed ball and, hence, will not unlock the sleeve 14. Simultaneously, the detent ball 40 is engaged with the groove 44 in the actuator, FIG. 4, to hold the actuator axially during the ensuing rotation thereof. In this position, the spring-pressed ball 40 will not pulse. Having released sleeve 14 from the valve body, the actuator 12 is now rotated counter clockwise by a known number of detents to bring the openings 56 and 58 in the sleeve into alignment with the openings 26 and 28, FIG. 4, in the valve body, whereupon the actuator 12 is moved to the right to withdraw the actuator pin 62 from the groove 59. The actuator 12 is now moved according to a known number of detents in a clockwise direction the predetermined number of detents to align the passage 54 therein with the openings 56, 58, FIG. 5. The final movement is to move the actuator axially to a position of engagement of the actuator pin 62 within one of the grooves to lock the actuator in its aligned position. To close the valve, the actuator with the pin 62 engaged with any groove 59 is rotated until the detent ball 36 falls into the opening 53, whereupon the actuator is withdrawn axially and rotated counterclockwise until the detent ball 40 falls into the locking detent against the vertical side wall 49. All combinations start from the lock position which is found strictly by feel, that is, when further movement under reasonable pressure is not possible.

For example, a possible combination might be R7 in – L3 out – R2 in. With this combination, the operator would turn the actuator 7 counts clockwise, push the actuator axially inwardly to unlock the sleeve, turn the actuator 3 counts counterclockwise, pull it out, turn the actuator 2 counts clockwise and, finally, push the actuator in to complete the combination. Based upon 12 detents per ball and 2 positions in and out, there are 288 possible combinations available.

To provide for a leaktight construction, the actuator is provided with axially disposed grooves 64—64 and the sleeve with axially spaced grooves 66—66 which contain, respectively, sealing rings 68—68 and 70—70.

It should be understood that the present disclosure is for the purpose of illustration only and includes all modifications or improvements which fall within the scope of the appended claims.

I claim:

1. A combination lock and remote control valve comprising a valve body containing a valve chamber and spaced ports, an actuator and concentric telescopically mounted sleeve in the valve chamber, said actuator and sleeve containing openings adapted at times to be oriented with respect to said spaced ports in the valve body to provide for a continuous passage through the valve body, means for rotating the actuator and moving it axially in the chamber, said sleeve containing an internal axial groove, means normally releasably locking the sleeve in a predetermined position, a pin fixed to the actuator movable with the actuator in rotation to position it opposite said axial groove in the sleeve at said predetermined position and axially along said groove to disable said last means, said actuator being thereafter rotatable to effect rotation of the released sleeve to align the openings in the sleeve with said spaced ports, movable axially to lock the sleeve in its open position, rotatable to align the openings therein with the openings in the sleeve and, finally, axially to engage the pin with the sleeve to lock the several components in the open position of the valve.

2. A device according to claim 1 wherein the means for releasably locking the sleeve comprises a radial opening in the sleeve in curvature with said groove, and a spring-pressed locking ball supported in the valve body for engagement within said opening.

3. A device according to claim 2 wherein the internal axial groove in the sleeve intersects the opening therein and the pin on the actuator is adapted by movement axially along the groove to disengage the ball from the opening at said locking position to release the sleeve.

4. A device according to claim 2 wherein the sleeve contains peripherally spaced semispherical detents within which the spring-pressed ball is adapted to be engaged after it has been displaced from said radial opening and in cooperation therewith to audibly indicate the degree of rotation of the actuator.

5. A device according to claim 1 wherein there is means for limiting rotation of the actuator to one direction from the locked position of the valve.

6. A device according to claim 5 wherein said last means comprises a locking detent on the actuator and a spring-pressed ball supported in the body for engagement therewith at the locking position, said locking detent having a flat wall and a slanted wall.

7. A device according to claim 6 wherein the actuator contains a peripheral groove within which the spring-pressed locking ball is adapted to ride when the actuator is moved axially in a direction to engage the pin with the groove in the slot.

8. A device according to claim 1 wherein there is a flexible cable connected to one end of the actuator for effecting its rotation and axial movement within the valve body.

9. A device according to claim 1 wherein the actuator and sleeve contain axially spaced peripheral grooves between which the openings in the actuator and sleeve are located and sealing rings disposed in said peripheral grooves.

* * * * *